United States Patent [19]
McGeeney et al.

[11] Patent Number: 5,938,543
[45] Date of Patent: Aug. 17, 1999

[54] MULTIPLE DENSITY GOLF CLUB HEAD AND METHOD OF MANUFACTURING THE SAME

[75] Inventors: James P. McGeeney, Poway; Thomas C. Morris, Carlsbad; Vikash Sanyal, Escondido, all of Calif.

[73] Assignee: Never Compromise, Inc., Vista, Calif.

[21] Appl. No.: 08/897,076

[22] Filed: Jul. 18, 1997

[51] Int. Cl.⁶ .................................................. A63B 53/04
[52] U.S. Cl. .......................... 473/324; 473/341; 473/342; 473/349
[58] Field of Search .................................. 473/324–350

[56] References Cited

U.S. PATENT DOCUMENTS

| | | |
|---|---|---|
| D. 275,744 | 10/1984 | McJunkin et al. . |
| D. 285,954 | 9/1986 | Hasegawa . |
| D. 288,952 | 3/1987 | Schmidt et al. . |
| D. 294,616 | 3/1988 | McCallister . |
| D. 316,128 | 4/1991 | Kinney, III . |
| D. 351,883 | 10/1994 | Solheim et al. . |
| D. 352,755 | 11/1994 | Cornish, III . |
| D. 363,748 | 10/1995 | Iinuma et al. . |
| D. 375,535 | 11/1996 | Gorman . |
| 3,042,405 | 7/1962 | Solheim .................................. 473/313 |
| 3,226,120 | 12/1965 | Borah ...................................... 473/412 |
| 3,937,474 | 2/1976 | Jepson ..................................... 473/342 |
| 3,941,390 | 3/1976 | Hussey .................................... 473/292 |
| 4,252,262 | 2/1981 | Igarashi . |
| 4,326,716 | 4/1982 | LaCoste .................................. 473/349 |
| 4,529,202 | 7/1985 | Jacobson ................................ 473/256 |
| 4,681,322 | 7/1987 | Straza et al. . |
| 4,804,188 | 2/1989 | McKee et al. . |
| 4,809,978 | 3/1989 | Yamaguchi et al. . |
| 4,812,187 | 3/1989 | Honma . |
| 4,852,880 | 8/1989 | Kobayashi . |
| 4,883,275 | 11/1989 | Boone . |
| 4,992,236 | 2/1991 | Shira ....................................... 419/28 |
| 5,094,810 | 3/1992 | Shira . |
| 5,141,230 | 8/1992 | Antonious . |
| 5,217,227 | 6/1993 | Shira . |
| 5,308,067 | 5/1994 | Cook ...................................... 473/341 |
| 5,358,249 | 10/1994 | Mendralla . |
| 5,362,056 | 11/1994 | Minotti .................................... 473/251 |
| 5,377,986 | 1/1995 | Viollaz et al. . |
| 5,397,126 | 3/1995 | Allen ....................................... 473/324 |
| 5,405,136 | 4/1995 | Hardman . |
| 5,409,219 | 4/1995 | Saksum .................................. 473/305 |
| 5,423,535 | 6/1995 | Shaw et al. . |
| 5,439,223 | 8/1995 | Kobayashi . |
| 5,489,094 | 2/1996 | Pritchett . |
| 5,497,993 | 3/1996 | Shan . |
| 5,575,472 | 11/1996 | Magerman et al. . |
| 5,580,058 | 12/1996 | Coughlin ................................ 273/250 |
| 5,586,947 | 12/1996 | Hutin . |
| 5,669,825 | 9/1997 | Shira ....................................... 473/324 |
| 5,690,562 | 11/1997 | Sturm ..................................... 473/340 |

OTHER PUBLICATIONS

Ray Cook Golf Company, "The Hardest Part of Golf Just Got Softer," (date not known, before May 28, 1997).
"Marketing the King," *Parvalu,* (Apr. 1997).
Golf Equipment Professionals of America Inc., "Gepa Golf Clubs," (date not known, before Jul. 18, 1997).
Ray Cook Golf Company Advertisement, 1997.
*Marketing the King,* Parvalu Magazine, 1997.
Golf Equipment Professionals of America, Inc., Sales Brochure.

*Primary Examiner*—Jeanette Chapman
*Assistant Examiner*—Stephen L. Blau
*Attorney, Agent, or Firm*—Baker & McKenzie

[57] ABSTRACT

A multiple density golf club head including a heel formed of a dense metallic material, a toe formed of a dense metallic material and a center segment formed of a non-metallic material is provided. The non-metallic material of the center segment has a density substantially less than the metallic material comprising the heel or the toe. The materials in the heel, toe and center segment extend for the entire depth of the club head. The positioning of the higher density regions at the heel and toe of the golf club provides for desirable heel-toe weighting characteristics. Also disclosed is a method for manufacturing a golf club head in accordance with the present invention. The method incorporates various manufacturing techniques into a cost effective process for manufacturing the club head of the present invention.

10 Claims, 5 Drawing Sheets

MULTIPLE DENSITY GOLF CLUB HEAD AND METHOD OF MANUFACTURING THE SAME

BACKGROUND OF THE INVENTION

1. Field of the Invention

The present invention relates to golf club heads, and more particularly, to a golf club head which includes sections having different densities and materials.

2. Description of the Related Art

Presently, golf clubs can be classified into three groups: woods, irons, and putters.

Generally, woods are used by golfers at the tee area to drive the golf ball over long distances. Woods were originally constructed of wood materials, such as persimmon. While woods constructed from wood materials are still prized by many golfers, their performance may be less than optimum because of the low density of the wood material used. Therefore, the "metal wood" club was created to enhance the performance of wood-type clubs. A metal wood reproduces the shape of a traditional wood but has a head made entirely of steel or other metallic material.

Irons are generally used for intermediate strokes usually between the teeing ground and the green where the hole is located. Typically, an iron has a club head which is manufactured from some form of metal, such as steel, which forms the entire head of the club.

The third type of golf club, the putter, is used on or around the green area for sinking the golf ball into the golf hole. The club head of the putter is generally constructed of a metallic material, as in the irons.

Woods, irons, and putters all have a strike face which contacts the golf ball when the ball is struck by the golf club head.

Various strategies have been used to improve the hitting characteristics of golf club heads. One of the strategies has been to add inserts to the face of the golf club head. In designing a golf club with face inserts, the material of the insert is selected to provide the desired hitting characteristics in the golf club. The properties of the insert material, such as the weight, friction, flexural modulus, and hardness, can greatly influence the hitting characteristics of the golf club. For example, insert materials having a high coefficient of friction tend to produce a golf club that generates higher levels of spin on the golf ball, which allows the better golfer to control and manipulate the golf shot. However, the novice player may not prefer a golf club that produces high levels of spin on the golf ball as it may decrease the distance of the golf shot and may increase the tendency of the golf ball to hook or slice.

Many variations of club heads having such face inserts have been proposed. Generally speaking, the insert covers only a portion of the face of the golf club head and extends into the club only for a portion of the depth of the club head. Often, the club head has a backing material into which the insert is placed. Examples of golf club heads having inserts can be found in U.S. Pat. Nos. 4,883,275, 5,358,249, 5,405,136, 5,423,535, 5,489,094 and 5,575,472.

Another strategy for improving the hitting characteristics of golf club heads is to adjust the weight distribution within the club head. It is well known that the weight distribution in the head affects the tendency of the club head to rotate about the golf club shaft during ball/club impact, especially when the ball/club impact occurs in a position on the club face other than the center of gravity. Various weighting techniques have been attempted to reduce this rotational tendency by changing the weight distribution in the club head. Such techniques often involve either perimeter weighting in which the weight is distributed to the perimeter areas of the club away from the center of the club head, or heel-toe weighting in which materials having different densities are used in the heel, toe and center portions of the club head in order to distribute more weight in the heel and toe of the golf club.

One form of perimeter weighting uses perimeter weight inserts. The use of lower density face inserts also may serve to distribute weight to the perimeter of the club head. Perimeter weighting characteristics can also be achieved by shaping a club head to produce a cavity in the back of the club thereby producing a complex shape wherein the weight of the club is greater along the perimeter of the club head. One version of the heel-toe weighting involves fabricating a club head wherein high density alloys are used in the heel and toe portions of the club head and a low density alloy is used in the center portion of the club head. Examples of perimeter weighting and heel-toe weighting techniques can be found in U.S. Pat. No. 4,992,236.

While the use of perimeter weighting, heel-toe weighting and face inserts in the design of golf club heads has improved the performance of golf clubs, these techniques have also raised the price of these specially designed golf clubs as the manufacturing and assembly operations used in producing these types of club modifications are relatively complex.

Therefore, there is a continuing need in the art for a golf club head that combines the performance characteristics of golf club heads having perimeter weighting and heel-toe weighting and the performance characteristics of golf club heads using face inserts, and can provide a better feel and a head structure which limits the adverse effects of an off center ball/club impact while achieving manufacturing cost efficiencies not possible with the complex manufacturing operations used in present golf club designs.

SUMMARY OF THE INVENTION

The present invention alleviates to a great extent the disadvantages of golf club heads having perimeter weighting and face inserts by providing a golf club head with a uniform depthwise construction, a relatively dense section at the heel and toe of the club head, and a relatively less dense section in the center of the club head. The relatively dense materials in the heel and toe regions of the club head extend the entire depth of the club head, respectively at the heel and toe regions. Likewise, the lower density material in the central region of the club head extends for the entire depth of the club head in the central region. The positioning of the higher density regions at the heel and toe of the golf club provides for desirable heel-toe weighting characteristics. Specifically, a high inertia design is achieved by placing high-density metals in the toe and heel as far from the center segment of the golf club as is possible. The center segment of the club is made with lower density materials. A high inertia design is desired to prevent the golf club from twisting when striking a golf ball on other than the "sweet spot" or center of gravity of the club.

A golf club head having features of the present invention comprises three discrete segments: a heel formed of a dense metallic material; a toe formed of a dense metallic material; and a center segment formed of a non-metallic material. The non-metallic material of the center segment has a density substantially less than the metallic materials comprising the heel or the toe. The heel, toe and center segment are joined together to form a strike face which is used to contact the golf ball when the golf club is swung. The non-metallic material used in the center segment is homogenous substantially entirely along at least one plane perpendicular to the strike face of the golf club head. In other words, at least one depthwise traverse in the center segment from the front surface to the back surface of the club head would consist entirely of the non-metallic material.

The present invention also provides a method for manufacturing a golf club head in accordance with the present invention. The method of the invention includes the steps of forming the toe of the golf club head in a first forming operation and forming the heel of the golf club head in a second forming operation. The heel and the toe are then placed in a molding die on opposite sides of a die chamber which is shaped to form a center segment of the club head. The center segment of the club head is then formed by a plastic molding operation which introduces polymeric material into the die chamber. The resulting club head includes a center segment connecting the heel and the toe in a unitary club head structure. Various manufacturing processes are suitable for forming the heel and toe of the club head such as: powder metallurgy, which includes a hot or room temperature compaction operation with a high temperature sintering procedure and is optionally followed by a forging or metal infiltration cycle, injection molding, investment casting, and machining. Plastic molding operations suitable for forming the center segment and connecting the heel and toe include resin transfer molding, injection molding, reaction injection molding, and compression molding.

It is therefore an object of the present invention to provide a golf club head that combines a better feel and a head structure which limits the adverse effects of an off center ball/club impact while achieving manufacturing cost efficiencies not possible with other golf club head designs.

It still another object of the present invention to provide a method of manufacturing a golf club head having a heel formed of a dense metallic material, a toe formed of a dense metallic material, and a center segment formed of a non-metallic material.

BRIEF DESCRIPTION OF THE DRAWINGS

These and other features, aspects, objects, and advantages of the present invention will become better understood upon consideration of the following detailed description, appended claims and accompanying drawings where:

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

Like reference numerals will be used to refer to like or similar parts from Figure to Figure in the following description of the drawings.

DESCRIPTION OF THE PREFERRED EMBODIMENTS

The several embodiments of golf club heads described below have certain features in common, and the following description and claims employ common directional words relating to those features. The ball striking surface or "strike face" of the club head, which is intended to hit the golf ball, is located on the "front" of the club head. The terms "top" and "bottom" assume that the club head is oriented as it would be if the golf club were held by a golfer in an at rest position, i.e., the bottom of the club head would contact the ground when at rest. Those skilled in the art may also refer to the bottom of the club head as the "sole". The heel of the club head is located laterally opposite the toe of the club head. The heel portion of the club head would be nearest the golfer when the golfer holds the club in an at rest position. The term "depth" refers to a dimension extending from the front to the back of the golf club.

Referring now to FIGS. 1, 2, 3A and 3B, the numeral 20 designates generally a putter-type club head which includes a body 21 and a hosel 22. The hosel is provided with a bore 23 for attaching the club head 20 to a conventional shaft. The body includes a heel 24 which joins with the hosel 22, a toe 25, a bottom surface 26, a top surface 27, a back surface 28, a generally planar strike face 29, and a center segment 30. One skilled in the art would realize that the putter 20 depicted in the Figures is a "blade" type putter. However, the present invention also applies to the commonly sold "mallet" type putters and to less conventional putter designs.

The material of the central segment 30 is different than the material of the heel 24 and toe 25. Specifically, the center segment 30 comprises a non-metallic material and the heel 24 and toe 25 each comprise a metallic material. In the Figures, cross hatching is used to depict the metallic materials and dashed lines are used to depict the non-metallic materials. The metallic material used in the heel and toe may be the same or different depending on the hitting characteristics desired. As used throughout the specification and claims, the term "metallic material" refers to an engineering material that includes at least one metal. Therefore, an organic material having metal would be considered a metallic material. In most cases, the non-metallic material of the center segment 30 will be softer than the metallic material of the heel 24 and toe 25. The center segment 30 will thereby cushion and absorb the impact with the ball.

In specific embodiments of the invention, the center segment 30 comprises an elastomer. Preferably, the elastomer is a thermoplastic elastomer selected from the group consisting of styrene co-polymers, co-polyesters, polyurethanes, polyamides, olefins and vulcanates. Most preferably, the elastomer is a thermoplastic polyurethane. The specific non-metallic material selected should have a minimum durometer hardness of Shore D 50 as it is understood that the United States Golf Association requires this minimum hardness in the strike face of a golf club head. Inorganic fillers may also be added to the elastomer to enable one to achieve any combination of properties desired in the center segment. Suitable inorganic fillers include: glass; silicates; calcium carbonate; silica; metal oxides such as aluminum oxide, titanium dioxide, and zinc oxide; carbon black; and metal powders.

The heel 24 and toe 25 preferably each comprise a metallic material including at least two metals. The metallic materials should each have a final alloy density of at least 7 grams per cubic centimeter. In a more preferred version of the invention, the metallic materials each have a final alloy density of 7 to 13 grams per cubic centimeter. In a still more preferred version of the invention, the metallic materials each have a final alloy density of 9 to 11 grams per cubic centimeter. In a most preferred version of the invention, the metallic materials each have a final alloy density of approximately 10 grams per cubic centimeter.

The heel 24 and toe 25 may also each comprise a metallic material wherein a first metal is dispersed in a second metal. The dispersion of the first metal in the second metal is advantageously achieved by powder metallurgy techniques wherein a powder of the first metal is blended with a powder of a second metal and the resulting powder metal blend is compacted and sintered at temperatures below the melting point of both metals. The first metal should have a higher density than the second metal. The addition of a high density first metal to a lower density second metal allows the final alloy density of the metallic material of the heel 24 and the toe 25 to be increased in precision increments. In specific embodiments of the invention, the first metal has a density of at least 10 grams per cubic centimeter, and the second metal is selected from the group consisting of iron based alloys, nickel based alloys, and copper based alloys. Specific examples of a suitable first metal include tungsten, tantalum, niobium, and molybdenum. In one embodiment of the invention, the metallic material has a final alloy density of at least 10 grams per cubic centimeter and the metallic material has a final alloy density at least 8 times greater than the density of the non-metallic material.

Figure 1:
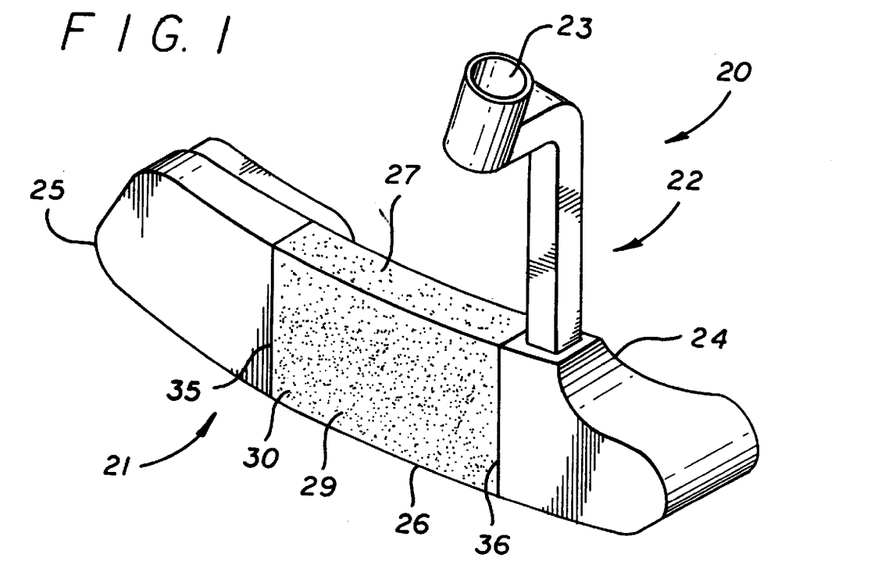
FIG. 1 is a front perspective view of a putter-type golf club head made in accordance with the present invention.
Figure 2:
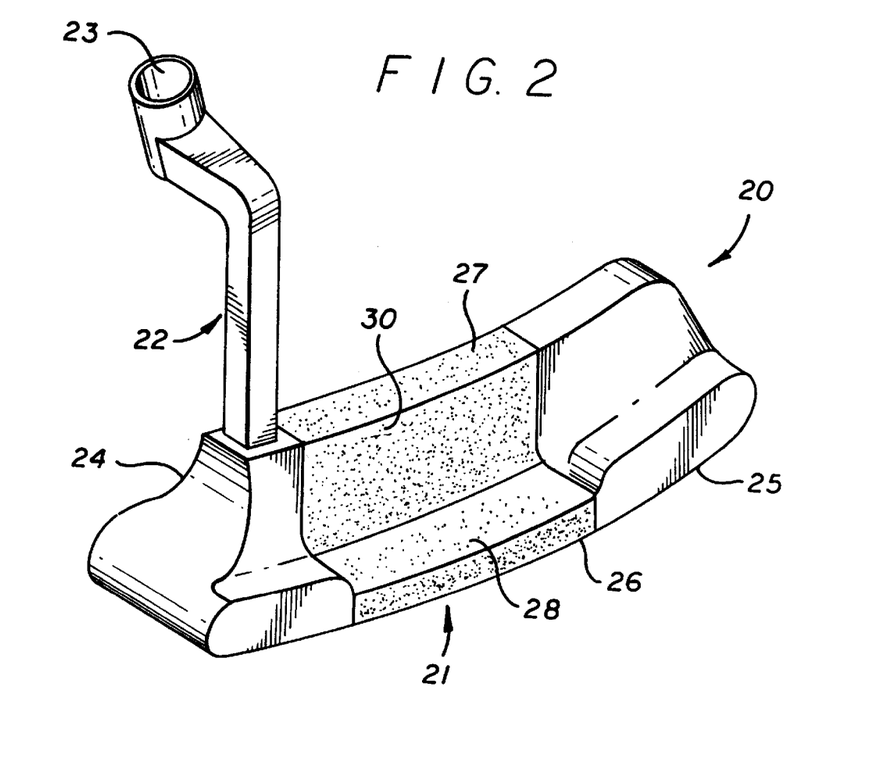
FIG. 2 is a rear perspective view of a putter-type golf club head made in accordance with the present invention.
Figure 3A:
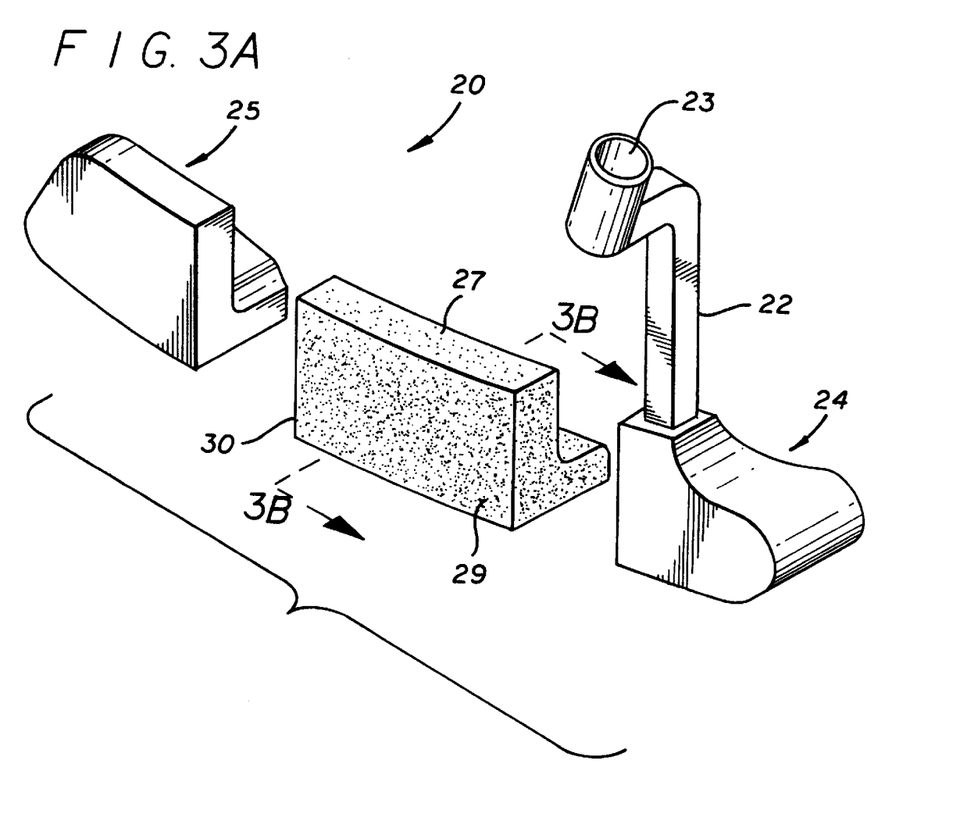
FIG. 3A is an exploded view of the components of a putter-type golf club made in accordance with the present invention.
Figure 3B:
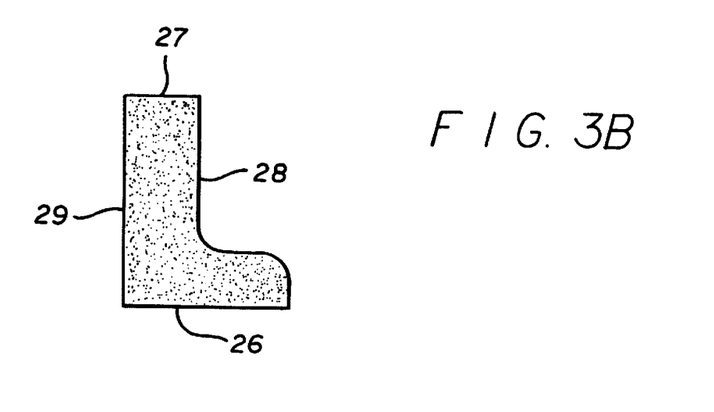
FIG. 3B is a sectional view taken along line 3—3 of FIG. 3A showing a cross-section of the center segment of a putter-type golf club made in accordance with the present invention.

The non-metallic materials used in forming the center segment 30 produce a final product wherein the non-metallic material has a substantially homogeneous composition. In addition, the non-metallic material comprising the center segment 30 of the club head is homogenous substantially entirely along at least one plane perpendicular to the strike face 29 as shown in FIG. 3B.

Figure 4:
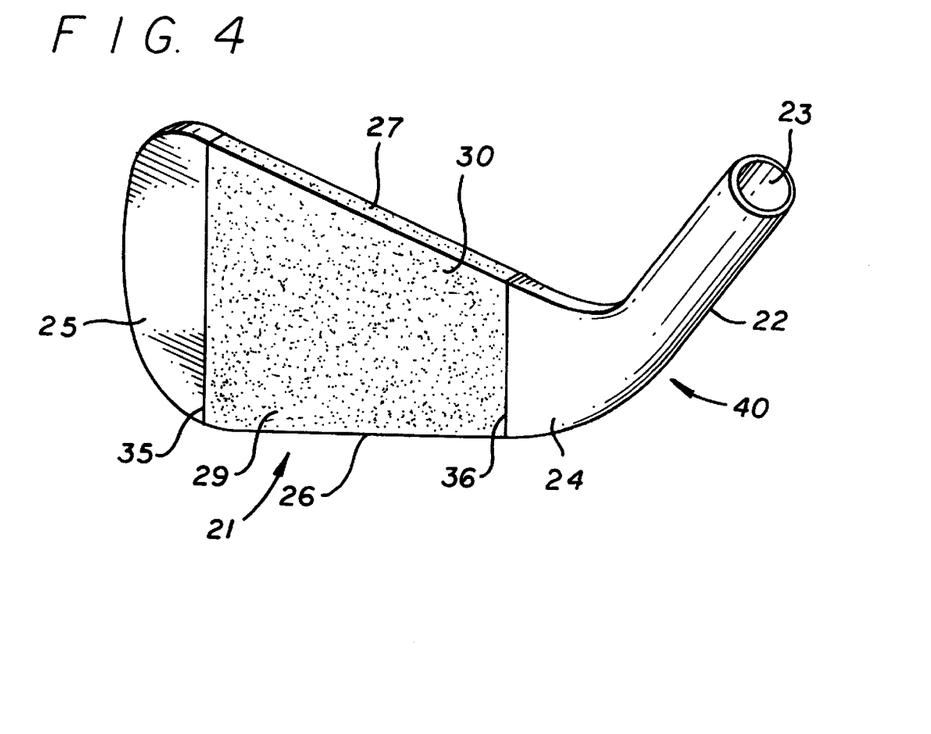
FIG. 4 is a front view of an iron-type golf club head made in accordance with the present invention.
Figure 5:
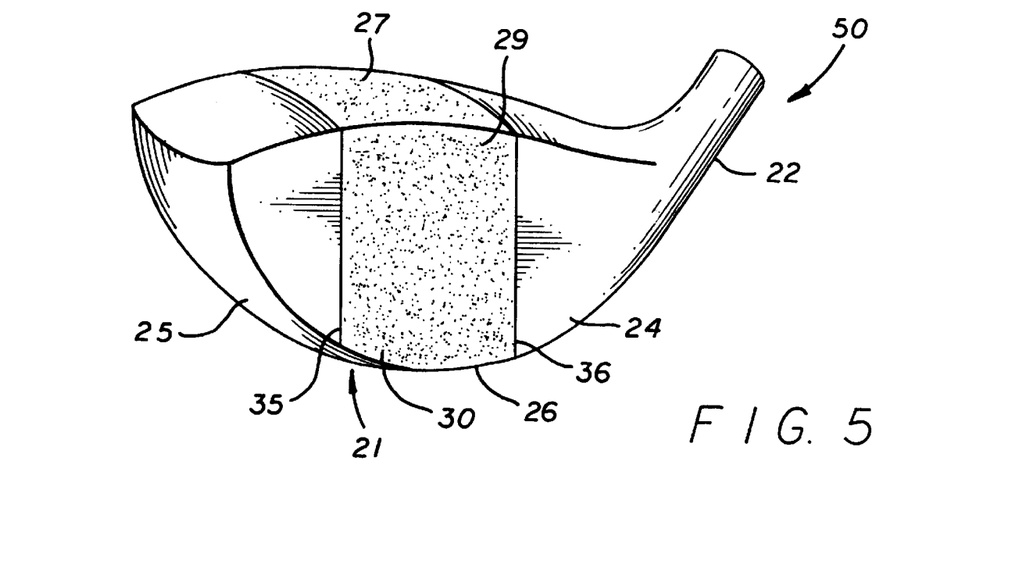
FIG. 5 is a front view of a wood-type golf club head made in accordance with the present invention.

FIG. 4 illustrates an iron-type club head 40 which is made in accordance with the invention. As can be seen from FIG. 4, the iron-type club head 40 has identical features as the putter-type golf club head 20 so reference can be to the description of the putter-type golf club head above. Similarly, FIG. 5 illustrates a wood-type club head 50 which is made in accordance with the invention and has identical features as the putter-type golf club 20. Therefore, reference can be made to the above description of the putter-type golf club head 20 for a description of the features of the wood-type golf club head 50.

A golf club head according to the present invention can be made in accordance with the method of the present invention. In one version of the method of the present invention, suitable molds are prepared in the shape of the components of the golf club head. Specifically, a first mold is prepared which has the shape of the toe 25 of the golf club head and a second mold is prepared having the shape of the heel 24 of the golf club head. These molds may be prepared using techniques and materials known to those skilled in the powder metallurgy art. After the molds have been prepared, each mold is filled with a powdered metallic material. Preferably, the same powdered metallic material is used in the first mold and the second mold. However, different powdered metallic materials could be used in the first mold and second mold.

After the powdered metallic materials have been placed in the first and second mold, the powdered metallic materials may be processed into the heel and toe portion of the golf club head by various powder metallurgy techniques. Specifically, more complex heel and toe designs can be most efficiently produced using cold isostatic pressing and pressureless sintering, whereas less complex heel and toe designs are best produced using hot die compaction, which is also referred to as hot pressing or pressure sintering. A combination of cold die compaction and pressureless sintering may also be used to produce the heel and toe.

In a powder metallurgy process employing cold isostatic pressing and pressureless sintering, the first and second molds which contain the powdered metallic material are compressed at a pressure sufficient to form a green compact of the metallic material in the mold. Typically, pressure is applied equally to the powder from all sides. Preferably, the isostatic pressing takes place at ambient temperatures and the molds are made of elastomeric materials. After the pressing step, the green compact is removed from the mold and the part may be trimmed if necessary to achieve the desired shape. Preferably, minimal finishing of the green compact is necessary. After the green compact has been suitably trimmed, if necessary, it is then heated at an elevated temperature to achieve densification of the metallic materials in the green compact through a sintering process. The particular temperature utilized in this step of the process will vary depending on the metallic materials used in the mold. The powdered metal heel and toe sections of the golf club head of the present invention are best produced by solid state sintering. This process requires that the green compacts be held at a very high temperature just below the melting point of the metallic materials. The sintering step of the process is generally performed without the introduction of pressure into the heating chamber.

In a powder metallurgy process employing cold die compaction and pressureless sintering, the powdered metallic materials in the first and second molds are compressed at a pressure sufficient to form a green compact of the metallic material in the mold. Generally, pressing takes place at ambient temperatures. After the pressing step, the green compact is removed from the mold and is then heated at an elevated temperature to achieve densification of the metallic materials in the green compact through a sintering process. The sintering step of the process is generally performed without the introduction of pressure into the heating chamber. Room temperature die compaction and pressureless sintering are usually performed when the metal powders are more easily compacted.

In a powder metallurgy process employing hot die compaction, the first and second molds which contain the powdered metallic materials are placed in a furnace and pressure and temperature are simultaneously applied to the metallic materials to achieve densification of the metallic materials in the mold. The particular temperature and pressure used in the hot die compaction step of the process varies depending on the metallic materials used in the mold. The hot pressing is typically conducted at approximately half the absolute melting temperature of the powder metallic material, which is usually a lower temperature than is used in the pressureless sintering process.

Figure 8:
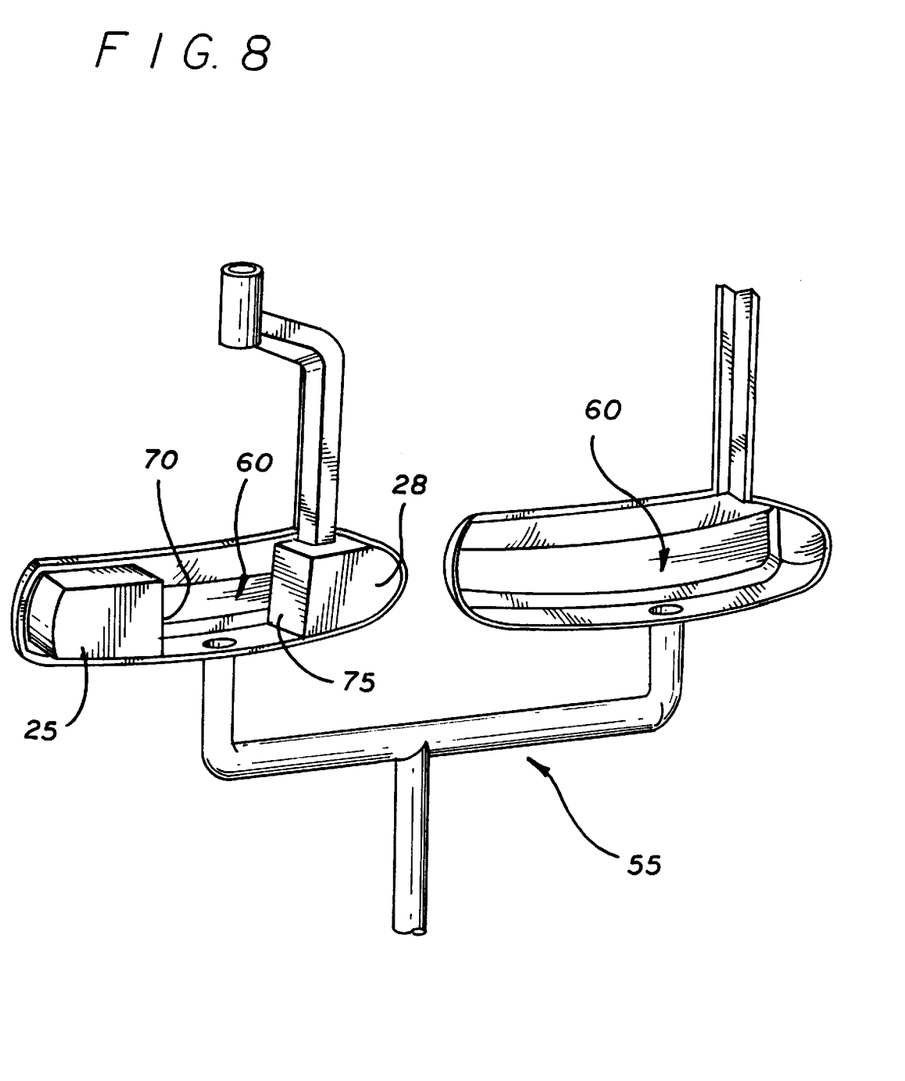
FIG. 8 is a perspective view of the bottom half of a molding die used in the method of the present invention.

After the sintered heel and the sintered toe of the golf club heads are produced in either the pressureless sintering or hot pressing process, they are allowed to cool and then are removed from the heating chamber. Preferably, the sintering process produces a near net shape heel and toe portion of the club head. The sintered heel and sintered toe are then placed in a molding die on opposite sides of a die chamber as shown in FIG. 8. The die chamber 60 in the molding die 55 is shaped in the form of the center segment 30 of the golf club head 20 of the present invention. The molding die 55 is shown in FIG. 8 with the sintered toe and sintered heel installed in the die chamber 60 on the left portion of the molding die 55. The right portion of the molding die 55 in FIG. 8 shows the die chamber 60 without the sintered toe and sintered heel installed in the die. It can be seen that the molding die 55 holds the sintered heel and the sintered toe in facing relationship on opposite sides of the die chamber 60.

Various plastic molding operations for introducing polymeric material into the die chamber and forming the center segment of the club head can be used in the method of the present invention. Four types of plastic molding operations would be particularly advantageous when employed in the method of the present invention.

First, resin transfer molding, wherein a polymeric material is injected into a closed mold at low pressure, would be suitable for forming the center segment of the club head. The low pressures used in resin transfer molding permit the use of molds that can contribute to a cost effective process. Resin transfer molding would be an excellent process choice for low to moderate production runs.

Second, injection molding, the most widely used plastic molding operation, would be beneficial in the method of the present invention. Injection molding techniques have now evolved to the point where extremely complex shapes can be molded in cost effective operations.

Third, reaction injection molding, wherein two or more liquid materials are mixed under high pressure and the resulting mixture is then injected into a mold at lower pressures where the material reaction is completed, would be suitable in the method of the present invention. The molds used in reaction injection molding can contribute to a cost effective process especially when reaction injection molding is used in low to medium production runs.

Fourth, compression molding, wherein a polymeric material is placed in a heated mold, the mold is closed, and compression pressure and heat are applied to the mold to shape a product, would be beneficial in the method of the present invention. This process offers economies at high volumes and would be beneficial for large production runs.

After the polymeric material has been introduced into the die chamber, the center segment 30 of the golf club head 20 of the present invention is formed. Because the sintered heel and the sintered toe are arranged in facing relationship on opposite sides of the die chamber 60 as shown in FIG. 8, the polymeric material bonds to an inner surface 75 of the sintered heel and an inner surface 70 of the sintered toe when the polymeric material is introduced into the die chamber 60. After the plastic molding operation is complete, the center segment 30 connects the sintered heel and the sintered toe in a unitary club head structure. Upon removal of the club head from the molding die, any minor flashing or gate marks on the center segment 30 of the golf club head 20 may be removed. In addition, the strike face 29 of the golf club head 20 may be milled to achieve a more pleasing aesthetic appearance. The resulting golf club head 20 has a high density heel 24, a lower density center segment 30 and a high density toe 25.

Figure 7:
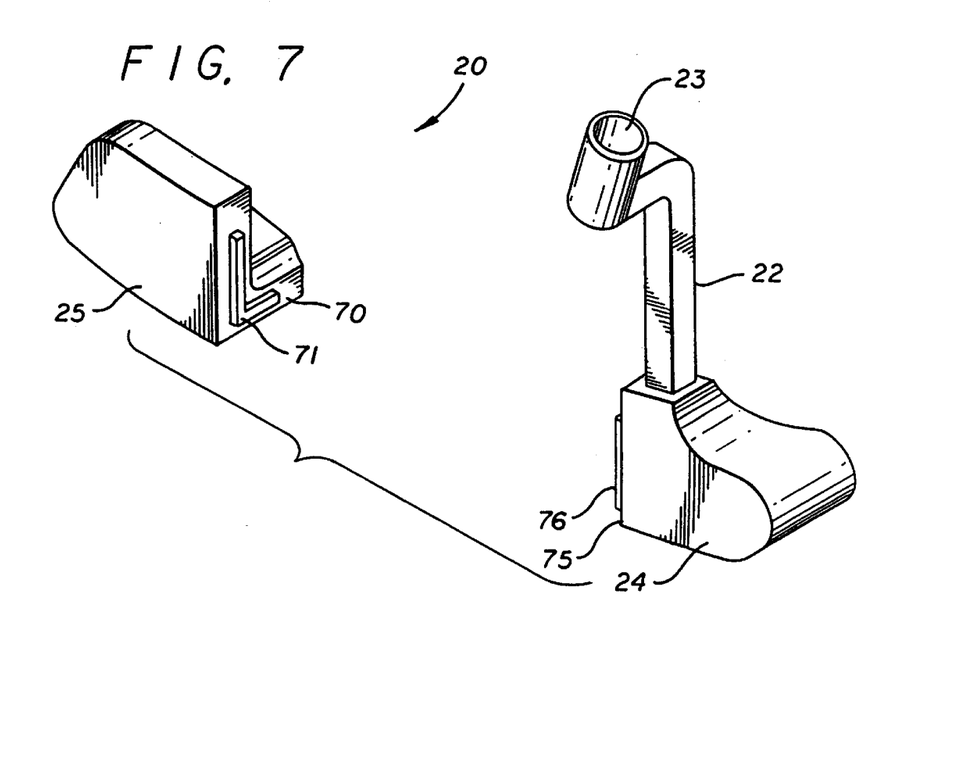
FIG. 7 is an exploded view of the heel and toe components of a putter-type golf club head made in accordance with the present invention wherein the center segment is not shown, the view showing projections on the inner surface of the components.

Various modifications to the method of the present invention may be made in order to improve the performance characteristics of the resulting golf club head. For instance, process variances that increase the metal/non-metal bond area and provide mechanical support to the joints between the center segment 30 and the toe 25 and between the center segment 30 and the heel 24 are available. In a first process variant, the toe and the heel are formed so that a projection is developed on the inner surface 70 of the toe and the inner surface 75 of the heel that are bonded to the polymeric material in the center segment of the club head. One version of these projections is shown in FIG. 7. In FIG. 7, it can be seen that an L-shaped projection 71 is formed on the inner surface 70 of toe 25 and an L-shaped projection 76 is formed on the inner surface 75 of heel 24. When the toe and heel are placed in the molding die as shown in FIG. 8, both of the projections 71, 76 are arranged so as to contact the polymeric material when the polymeric material is introduced into the die chamber of the molding die. In this manner, the solidified polymeric material which comprises the center segment of the club head surrounds the projections in the toe and heel, providing increased metal/polymeric material bond area. The arrangement of the projections of the toe and heel in the polymeric material provides the club head with increased resistance to shear stresses at both the first border between the center segment and the toe and the second border between the center segment and the heel of the club head. However, even if projections are formed on the inner surfaces of the heel and toe portions, the non-metallic material of the center segment will, along at least one plane perpendicular to the strike face of the club head, extend depthwise from the strike face of the club head to the back surface of the club head.

Figure 6:
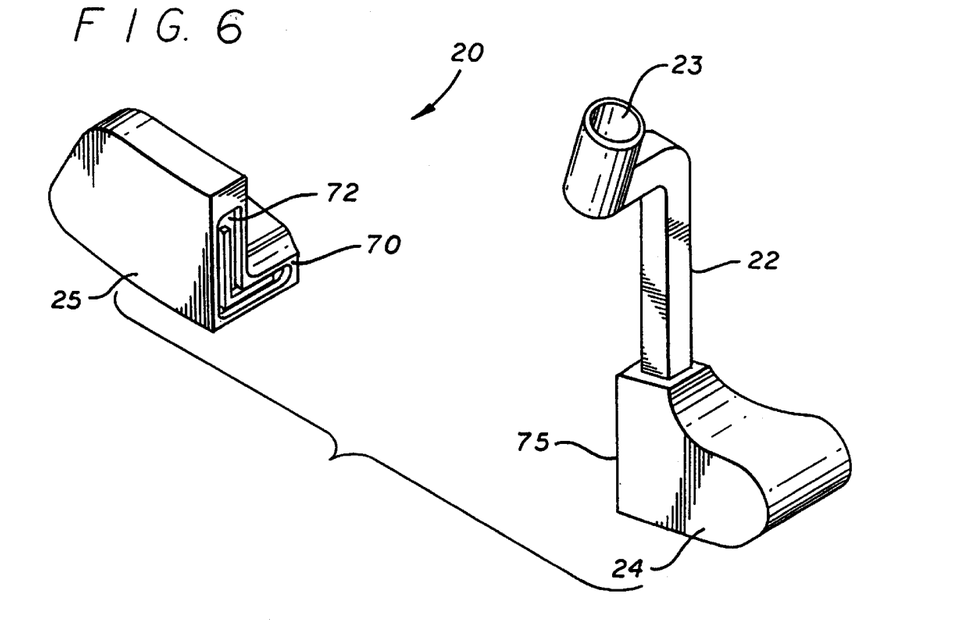
FIG. 6 is an exploded view of a putter-type golf club head made in accordance with the present invention wherein the center segment is not shown, the view showing recessed areas on the inner surface of the components.

In a second process variant, the toe and heel are formed so that a recessed area or undercut is developed in the inner surface of the toe and the inner surface of the heel. One version of these recessed areas is shown in FIG. 6, where it can be seen that a recessed area or undercut 72 is formed in the inner surface 70 of the toe 25. A similar recessed area or undercut 77 is formed in the inner surface 75 of heel 24. When the toe and heel are placed in the molding die as shown in FIG. 8, the undercuts 72, 77 are arranged facing the die chamber so that the polymeric material may flow into the undercuts 72, 77 in the toe and heel when the polymeric material is introduced into the die chamber. This arrangement of the heel, toe and center segment of the club head provides increased metal/polymeric material bond area and increases the resistance of the club head to the shear stresses that may develop at both the first border between the center segment and the toe and the second border between center segment and the heel of the club head.

In still another process variant of the method of the present invention, the inner surface 70 of the toe and the inner surface 75 of the heel are coated with a bonding agent before being placed in the molding die. The toe and the heel are then arranged in the molding die with the coated surfaces in facing relationship on opposed sides of the die chamber so that the coated surfaces contact the polymeric material when the polymeric material is introduced into the die chamber. The resulting bond between the polymeric material and the metallic materials is of enhanced strength. This enhanced bond resists the effects of shear stresses at both the first border between the center segment and the toe and the second border between the center segment and heel of the club head when the club head is contacted by an object.

In a process variant of the method of the present invention which employs pressureless sintering, at least one metallic member, such as a stainless steel pin or dowel, is inserted into a surface of each of the green compacts before the green compacts are heated at an elevated temperature. At least a portion of the metallic member is left protruding from the surface of the green compacts. When the green compacts are heated at an elevated temperature, the metallic member is diffusion bonded to the metallic material in the green compact. In this process variant, a projection, consisting of the portion of the metallic member protruding from the surface of the green compact, is developed in a surface of the sintered toe and in a surface of the sintered heel. The sintered toe and the sintered heel are then placed in the molding die so that both of the projections contact the polymeric material when the polymeric material is introduced into the die chamber. In this manner, the solidified polymeric material, which comprises the center segment of the club head, surrounds the projections in the sintered toe and sintered heel, providing increased metal/polymeric material bond area. The arrangement of the projections of the sintered toe and sintered heel in the polymeric material provides the club head with increased resistance to shear stresses at both the first border between the center segment and the toe and the second border between the center segment and the heel of the club head.

In still another process variant of the method of the present invention which employs isostatic pressuring and pressureless sintering, the second mold having the shape of the heel is formed so that a bore is developed in the green compact of the heel after compressing. A third mold having the shape of a hosel of the golf club head is then prepared and filled with a third powdered metallic material. The powdered metallic material in the third mold is then compressed at a pressure sufficient to form a green compact of the powdered metallic material. The green compact is then removed from the third mold. An end of the green compact having the shape of the hosel is then inserted into the bore of the green compact formed in the shape of the heel of the club head. The heel and hosel compacts fit together snugly so that the alignment of the heel and hosel may be maintained during subsequent processing. The combined heel and hosel compacts are then be heated at an elevated temperature to form a sintered heel that includes an integral hosel. The third powdered metallic material used in this version of the method of the invention may be identical to or different from the first and second powdered metallic materials.

In a further process variant, an effective amount of a colorant may be added to the polymeric material before molding so that the heel and the toe of the golf club head have a different color than the center segment of the golf club head. Alternatively, the surfaces of the toe and the surfaces of the heel may be treated so that the heel and the toe of the golf club head have a different color than the center segment of the golf club head. It is believed that contrasting colors in the heel, toe, and center segment of the club head provide for a pleasing aesthetic appearance.

Various surface treatments may be used to color the toe and heel portion. Suitable surface treatments may include: organic coatings, such as paint or preferably an enamel or acrylic electrocoating; conversion coatings such as zinc phosphate, manganese phosphate or black oxide; or electroplating such as a zinc, nickel or chromium plating with a dark color dichromate finish, e.g., zinc plating with a black dichromate.

In another process variant of the method of the invention, the appearance of the ball striking surface of the club head is enhanced by milling the ball striking surface. In the process variant wherein a surface treatment step is included in the method of the invention, the milling step would generally have to be performed before any surface treatment as milling the ball striking surface may remove the coating on the heel or toe.

Suitable materials to be used in the method of the present invention have been referenced above in the description of the club head of the present invention. Namely, the polymeric material used in the injection molding process step may be an elastomer, and preferably, the elastomer is a thermoplastic elastomer selected from the group consisting of styrene co-polymers, co-polyesters, polyurethanes, polyamides, olefins, and vulcanates. Most preferably, the polymeric material is a thermoplastic polyurethane. Inorganic fillers may also be added to the elastomer to enable one to achieve any combination of properties desired in the center segment. Suitable inorganic fillers include: glass; silicates; calcium carbonate; silica; metal oxides such as aluminum oxide; titanium dioxide; zinc oxide; carbon black; and metal powders.

The powdered metallic material used in the molding, compaction and sintering processes may preferably comprise a metallic material including at least two metals. Upon completion of the sintering step of the method, it is preferred that the metallic materials in the sintered heel and sintered toe each have a final alloy density of at least 7 grams per cubic centimeter. In a more preferred version of the invention, the metallic materials in the sintered heel and sintered toe have a final alloy density of 7 to 13 grams per cubic centimeter. In a still more preferred version of the invention, the metallic materials in the sintered heel and sintered toe have a final alloy density of 9 to 11 grams per cubic centimeter. In a most preferred version of the invention, the metallic materials in the sintered heel and sintered toe have a final alloy density of approximately 10 grams per cubic centimeter. In addition, it is preferred that the density of the sintered heel and the density of the sintered toe be at least 8 times greater than the density of the center segment.

The powdered metallic materials may also include a first powdered metal dispersed in a second powdered metal wherein the first metal has a higher density than the second metal. Preferably, the first powdered metal has a density of at least 10 grams per cubic centimeter, and the second powdered metal is selected from the group consisting of iron based alloys, nickel based alloys, and copper based alloys. Specific examples of a suitable first metal include tungsten, tantalum, niobium and molybdenum.

Various alternative manufacturing methods are also suitable for forming the heel and toe section of the club head. For instance, the heel and toe of the club head may be formed using investment casting techniques wherein a wax model of the heel and toe are made in a metal mold, several of the wax models are attached to a central member to form a "tree", the tree is dipped in a ceramic slurry thus building up a coating or "investment", and the assembly is heated in an oven, thus melting out the wax and leaving a cavity which is then used as a mold for liquid metal. The liquid metal is poured into the mold and allowed to cool to produce a heel or toe. High density commercially available alloys are suitable for melting and pouring into the investment casting molds. Preferably, the liquid metal used in the investment casting process is produced by melting a metallic bar which has been formed by powder metallurgy techniques. In this version of the investment casting process, powder metallurgy techniques can be used to produce a metallic bar having a density higher than commercially available alloys. Accordingly, when the liquid metal produced by melting the metallic bar solidifies in the mold, it will produce parts having a higher final density than parts produced from commercially available alloys. After the heel and toe are produced using investment casting techniques, they are connected in a unitary club structure using the plastic molding operations described above.

The heel and toe of the club head may also be formed using machining techniques wherein the toe and heel of the golf club head are machined from a solid piece of a metallic material such as a commercially available alloy. The heel and toe are then connected in a unitary club structure using the plastic molding operations described above.

In another alternative version of the method of the invention, the heel and toe of the club head may be formed using injection molding techniques wherein a fluid mixture including a polymeric material and a metallic material is injected into a first die chamber shaped to form the toe and a second die chamber shaped to form the heel. The first and second die chambers are then cooled to form the heel and toe, which are connected in a unitary club structure using the plastic molding operations described above.

Thus, it is seen that an improved golf club head and method of manufacture thereof is provided. It can be seen that the golf club heads of the present invention have desirable heel-toe weighting characteristics. Specifically, a high inertia design is achieved by placing high-density metals in the toe and heel as far from the center segment of the golf club as is possible. The center segment of the club is made with lower density materials. A high inertia design is desired to prevent the golf club from twisting when striking a golf ball on other than the "sweet spot" or center of gravity of the club.

In addition, the method of the present invention provides significant cost savings over other processes used to produce high performance golf clubs. The use of advanced powder metallurgy techniques allows for the production of near net shape heel and toe sections of the club head. This results in the elimination of hand finishing processes. The powder metallurgy techniques also allow the density of the heel and toe to be precisely controlled and altered by changing the ratio of heavy and light metals in the powder metal blend. The use of plastic molding techniques to produce the center segment of the club head also reduces manufacturing costs. Furthermore, the elimination of many of the manufacturing steps also decreases the lead time for production of the golf club head of the present invention.

Although the present invention has been described in considerable detail with reference to certain preferred embodiments, one skilled in the art will appreciate that the present invention can be practiced by other than the preferred embodiments, which have been presented for purposes of illustration and not of limitation. Therefore, the spirit and scope of the appended claims should not be limited to the description of the preferred embodiments contained herein.

What is claimed is:

1. A golf club head having a striking face and a back surface on generally a depthwise opposite side of the golf club head from the striking face, the golf club head having a substantially uniform depthwise construction from the striking face through to the back surface, the golf club head comprising:

a heel extending depthwise from the striking face to the back surface, the heel being formed of a first material having a first density;

a toe extending depthwise from the striking face to the back surface, the toe being formed of a second material having a second density; and a center segment extending depthwise from the striking face to the back surface and being formed of a third material having a density less than the first density and the second density, the center segment having:
  a first interface surface extending depthwise from the striking face to the back surface; and
  a second interface surface opposite the first interface surface and extending depthwise from the striking face to the back surface, wherein the heel is attached to the center segment at the first interface surface and the toe is attached to the center segment at the second interface surface.

2. The golf club head of claim 1 wherein said first material and said second material are the same material and said first density is the same as said second density.

3. The golf club head of claim 1 wherein:

the first interface surface is planar and extends perpendicularly from the striking face to the rear surface; and the second interface surface is planar and extends perpendicularly from the striking face to the rear surface.

4. The golf club head of claim 1 wherein:

the toe includes a toe planar surface extending depthwise from the striking face to the back surface, the toe being attached to the center segment at the toe planar surface; and the heel includes a heel planar surface extending depthwise from the striking face to the back surface, the heel being attached to the center segment at the heel planar surface.

5. The golf club head of claim 1 wherein the strike face extends across one side of said heel, toe, and center segment, said third material of said center segment being homogenous substantially entirely along at least one plane perpendicular to said strike face.

6. The golf club head of claim 1 wherein the third material of said center segment includes a polymeric material.

7. The golf club head of claim 1 wherein the third material comprises a thermosetting polymer.

8. The golf club head of claim 1 wherein said first material and said second material are metallic materials.

9. The golf club head of claim 1 wherein:

said first material and said second material are the same material and are both metallic materials; and said third material of said center segment includes a polymeric material.

10. The golf club head of claim 9 further comprising a chemical bonding agent bonding said heel to said center section and a chemical bonding agent bonding said toe to said center section along said first and second interface surfaces.

* * * * *